2,899,471
METHOD FOR THE MANUFACTURE OF ALKYL IODIDES

Frederic R. Huber, Ramsey, and Leslie M. Schenck, Mountainside, N.J., assignors to General Aniline & Film Corporation, New York, N.Y., a corporation of Delaware No Drawing. Application June 18, 1958
Serial No. 742,704

9 Claims. (Cl. 260—652)

This invention relates to an improved method for the commercial production of alkyl iodides in a practical and most economical manner.

The synthesis of alkyl iodides is not new to the art. Dumas and Peligot, Ann. 15 20 (1835) first reported the preparation of methyl iodide by the reaction of an alcohol with phosphorus and iodine. A furtherance of their early work is reported by Ipatieu, J. Russ. Phys. Chem. Soc. 27 I, 364 (1895); Crisner, 717 (1892); and Walker and Johnson, J. Chem. Soc. 87 1592 (1905). Adams and Voorhess, J. Am. Chem. Soc. 41, 789–98 (1919) improved upon the red phosphorus-yellow phosphorus-alcohol iodine synthesis of Walker, and by equipment modification were able to prepare larger amounts of the several lower alkyl iodides in yields of 90–100% of the theoretical.

Hunt, J. Chem. Soc. 177 1592–4 (1920) verified the work of Beilstein and Rieth, Ann. 126 250 (1863), that one atom of phosphorus reduces five atoms of iodine instead of the assumed three atoms reported in much of the earlier work. As late as 1931, Hirao, J. Chem. Soc. Japan 52 269–70 (1931) disclosed a more rapid method of converting an alcohol, phosphorus and iodine to an alkyl halide in 90% yield.

In addition to the classical phosphorus and iodine synthesis of alkyl iodides, given in excellent detail by King in Organic Synthesis, Collective vol. II, pp. 399–404, John Wiley and Sons, Inc., Weinland and Schmidt, German Patent 175,209, describe the preparation of methyl iodide and ethyl iodide by reacting dimethylsulfate with an aqueous solution of potassium iodide in the following manner:

Peacock and Menon, Quart. J. Indian Chem. Soc. 2 240 (1925) employed a similar approach by converting the methyl and ethyl esters of p-toluenesulfonic acid to the corresponding alkyl iodides with potassium iodide in 84.5 and 66.6% yields, respectively. This work was substantiated by Rodionov, Bull. Soc. Chem. 39 305–25 (1926).

In two works, Jones and Green, J. Chem. Soc. 1926 270; J. Chem. Soc. 1927 928, report the reaction of aluminum with three atoms of iodine, with hydrolysis of the aluminum tri-iodide in the presence of an alcohol and water to produce the corresponding alkyl iodide. These workers state aluminum can advantageously be used instead of phosphorus in the synthesis.

To avoid the use of phosphorus, an element of pyrophoric nature, numerous workers have since devised methods for synthesis of alkyl iodides which, although expensive and cumbersome in operation, eliminate the hazards encountered in using phosphorus as an intermediate chemical. Kimball, J. Chem. Education 10 747 (1933) reacted iodoform with potassium hydroxide in 95% ethanol, distilled off the ethanol solvent, acidified the resultant mixture prior to filtering, and then rendered the filtrate alkaline with sodium hydroxide followed by heating with commercial dimethylsulfate to obtain methyl iodide in 78% yield. To obtain ethyl iodide in 80% yield, Kimball teaches heating the alkaline filtrate described above with commercial diethylsulfate.

Dangyan, J. Gen. Chem. (USSR) 10 1668–9 (1940) obtained methyl iodide in 50.3% yield by heating methanol with iodine and iron, ethyl iodide in 96% yield by fusing ethylacetate with iodine in the presence of iron. In a later work, Dangyan, J. Gen. Chem. (USSR) 11 314–18; 11 616–18 (1941) describes the utilization of aluminum and ethylacetate with iodine at 110–210° C. to form ethyl iodide, and magnesium, iodine, and methylbenzoate to synthesize methyl iodide in 70–90% of theoretical yield. Dangyan further teaches that the reaction of aluminum, alcohol, and iodine to form alkyl iodides is an excellent method of preparation, but that extreme caution is required during the heating period of the synthesis.

Landover and Rydon, J. Chem. Soc. 1953 2224–34 report the preparation of ethyl iodide in 62% yield by the distillation of ethanol from silver iodide. In British Patent 695,648 of July 12, 1953, Landover and Rydon demonstrate a method for the synthesis of alkyl iodides whereby an alkyl, aryl or alkyl-aryl phosphate is heated with an alkyl halide and an alcohol to obtain an alkyl exchange of 77% in the case of ethyl alcohol. de Postes, Compt, Rend. 223 681–2 (1946) proposes the preparation of methyl iodide by the introduction of gaseous hydrogen chloride at 20° C. into a mixture of zinc, methanol and iodine.

Still other methods of preparation, Norris, Am. Chem. J. 38 639 (1907), utilized the slow distillation of methanol from an excess of constant boiling hydriodic acid to form methyl iodide, and Peacock and Menon, Quart. J. Indian Chem. Soc. 2 240 (1925) and Rodionov, Bull. Soc. Chem. (4) 39 323 (1926) resorted to the electrolysis of aqueous potassium iodide in the presence of methyl p-toluene-sulfonate.

Commercially, the alkyl iodides, and more specifically, methyl iodide and ethyl iodide, are produced by either the reaction of the corresponding alcohol with phosphorus and iodine, or by the reaction of a dialkylsulfate on a solution of sodium or potassium iodide. It is of especial interest that in the latter reaction, as described by Hartman, Organic Synthesis, Collective vol. II, p. 404, John Wiley and Sons, Calcium carbonate is added to the mixture to insure a neutral or alkaline condition throughout the course of the reaction. To those skilled in the art, the inherent danger in commercial production of alkyl iodide by the use of phosphorus and iodine is quite obvious. Partington, Text book of Inorganic Chemistry, Sixth Edition, Macmillan and Company, Ltd., pp. 566–567 states: "A characteristic property of white phosphorus is the ease with which it undergoes spontaneous oxidation when exposed to air at the ordinary temperature, accompanied by a green glow or phosphorescence. If warmed to about 50° it inflames in dry air and burns with a white flame, forming white fumes of the pentoxide $P_2O_5$. It inflames spontaneously in chlorine, explodes violently in contact with liquid bromine, and inflames in contact with solid iodine." Furthermore, Partington discloses the so-called red phosphorus of commerce contains about 0.5% of white phosphorus, from which it is prepared.

It is an object of the present invention to provide an improved method of preparing alkyl iodides while avoiding the shortcomings and inherent dangers accompanying the prior art methods.

A further object is to provide a method in which the chemical consumption is maintained at a minimum and the most basic raw materials are employed with the attendant advantage of a commercially economical process.

Other objects and advantages will become manifest from the following specification.

We have discovered that alkyl iodides are readily and conveniently prepared by reacting a dialkyl sulfate at a pH of 1-6 with hydriodic acid produced in situ from the action of an aqueous solution containing bisulfite ions, $HSO_3^-$, on elemental iodine. In other words, an aqueous suspension of pure or crude iodine is reduced in situ and the resultant hydriodic acid converted to an alkyl iodide by reaction with a dialkyl sulfate. This new method is considered to be represented by the following series of reactions:

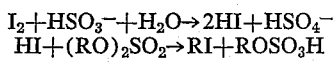

$$I_2 + HSO_3^- + H_2O \rightarrow 2HI + HSO_4^-$$
$$HI + (RO)_2SO_2 \rightarrow RI + ROSO_3H$$

wherein R represents an alkyl radical of from one to five carbon atoms, e.g. methyl, ethyl, propyl, butyl and amyl radicals.

In reducing the foregoing reactions to practice, 1 mole of elemental iodine is added with stirring to a sufficient amount of water, about 1-10 parts by weight of water per 1 part by weight of iodine, to form a slurry. To the slurry is then added over a period of 1-3 hours with constant agitation or stirring, either anhydrous sodium sulfite (2-3 moles per mole of iodine) or sodium bisulfite as a 37% aqueous solution (2-3 moles based on anhydrous sodium sulfite per mole of iodine), until the iodine color of the slurry disappears while maintaining the temperature from 0° C. to 100° C., preferably at 20°-40° C. In lieu of either aqueous or anhydrous sodium bisulfite, gaseous sulfur dioxide from a cylinder may be passed into the aqueous-iodine slurry until no iodine color remains, while maintaining the temperature below 70° C. and preferably at 20°-40° C. The amount of gaseous sulfur dioxide required to discolor the iodine slurry is approximately 1 part by weight per 2 parts by weight of elemental iodine. The colorless solution is then heated to a temperature ranging from 45°-100° C., and 2.0 to 2.5 moles of a dialkyl sulfate such as dimethyl-, diethyl-, dipropyl, dibutyl- or diamyl-sulfate added over 1-3 hours while distilling off the alkyl iodide as it is formed. When the addition of the dialkyl sulfate is complete, the reaction mixture is heated to a temperature ranging from 45° C. to 105° C. to complete the product distillation. The product is washed with cold water and dried over anhydrous calcium chloride, potassium sulfate, sodium sulfate or any one of the conventionally employed drying agents. After the water wash and prior to drying, the alkyl iodide may be treated, if desired, with 1% aqueous sodium carbonate solution to neutralize any sulfurous acid distilled with the product. The yield of alkyl iodide ranges from 88% to 99% of theory, the higher yields being obtained with the lower alkyl iodides, i.e. methyl and ethyl iodides.

In connection with the foregoing procedural steps, it will be obvious to those skilled in the art that although we prefer the convenience of operating at normal atmospheric pressure within the temperature ranges described, lower temperatures are permissible if the operation is conducted at sub-atmospheric pressures and increased temperatures may be advantageous when operating at elevated pressures.

By operating at pH levels of 1-6 under our reaction conditions at an elevated temperature range in the presence of a dialkyl sulfate (dialkylsulfuric acid ester), we are able to produce in essentially quantitative yield the corresponding alkyl iodide. Our process eliminates the need of expensive alkali salts of iodine, which in themselves are an art to prepare, and no specialized equipment is needed and no by-products formed which require a specialized disposal technique.

The following examples will illustrate more clearly the procedure to be employed in the preparation of alkyl iodides in accordance with our improved method.

*Example I*

Into a 5 liter 4-neck flask equipped with an efficient agitator, thermometer, dropping funnel and condenser set for distillation, there were charged 820 grams of water and 1050 grams (4.14 moles) of commercial iodine. Over a period of 2-3 hours at a temperature ranging between 20 and 40° C. there were added 910 grams of sodium bisulfite as a 37% aqueous solution (8.75 moles). The colorless solution which has a pH of 1.65 was heated to 70-80° C. and to it was added over a period of 1 to 2 hours 1540 grams of diethyl sulfate (10 moles), while distilling off the iodoethane as it was formed. When the diethyl sulfate addition was complete the reaction mixture was heated to 95° C. to complete the product distillation, the product washed with cold water and 1% aqueous sodium carbonate solution, and dried over anhydrous calcium chloride. The yield of the product amounted to 1280 grams which analyzed as 98% iodoethane by iodine analysis.

*Example II*

Into a 2 liter flask equipped with agitator, thermometer, inlet tube and condenser set for distillation, there were charged 100 grams of iodine (0.394 mole) and 900 grams of water. To the aqueous slurry gaseous sulfur dioxide (ca. 55 grams) was passed until no iodine color remained while maintaining the temperature below 70° C., i.e. at 65-68° C. The aqueous solution which has a pH of 1.5 was heated to 70-75° C. and to it over a one hour period there were dropped 125 grams (0.813 mole) of diethyl sulfate while distilling off the ethyl iodide as it was formed. The distillate was washed with 200 grams of cold water then with 100 grams of 1% aqueous sodium carbonate solution and then dried over anhydrous potassium sulfate. There was obtained 120 grams of iodoethane which is equivalent to 98% of theory.

*Example III*

Into a 5 liter 4-neck flask equipped as in Example I there were charged 100 grams (0.394 mole) of commercial iodine and 1000 grams of water. Agitation was begun of the slurry and to it added over one hour 100.5 grams of anhydrous sodium sulfite (0.835 mole). The colorless solution which has a pH of 1.7 was heated to 75° C. and 125 grams of diethyl sulfate (0.813 mole) added over a period of 1 hour while distilling off the iodoethane as it was formed. The distillate was water washed and dried over anhydrous sodium sulfate to yield 121 grams of iodoethane which analyzed pure by iodine analysis or 97% of theory.

*Example IV*

Into a 2 liter 4-neck flask equipped with an efficient agitator, thermometer, dropping funnel and condenser and set for distillation there were charged 127 grams of commercial iodine (0.5 mole) and 750 grams of water. To the agitated slurry there were added over a 2 hour period 106 grams of sodium bisulfite (1.06 mole) as a 37% aqueous solution. The resultant colorless solution which had a pH of 1.6 was warmed to 45° C. and to it added 130 grams of dimethyl sulfate (1.03 mole) over a period of 2 hours. The methyl iodide was distilled off as it was formed and then water washed and dried over anhydrous calcium chloride to yield 140 grams of methyl iodide which is equivalent to 98.5% of theory.

*Example V*

Into a 1 liter flask equipped with an efficient stirrer, thermometer, inlet tube and condenser set for distillation, there were charged 50 grams of commercial iodine (0.195 mole) and 250 grams of water. To the agitated slurry was added over 1 hour 26 grams of gaseous sulfur dioxide (0.405 mole). The resultant clear solution which has a pH of 1.4 was heated to 100° C. and to it added over a 2 hour period 72.8 grams of di-n-propyl sulfate (0.4 mole), while distilling off n-propyl iodide as it was formed. The distillate was water washed and then dried over sodium sulfite to yield 62 grams of n-propyl iodide which analyzed 99% by iodine analysis and which is equivalent to 90% of theory.

*Example VI*

Example I was repeated with the exception that 1540 grams of diethyl sulfate were replaced by 2100 grams (10 moles) of di-n-butyl sulfate. The n-butyl iodide was distilled off as it was formed, washed with water and dried over anhydrous calcium chloride to give 1360 grams of n-butyl iodide which is equivalent to 89% of theory.

*Example VII*

Example I was again repeated with the exception that 1540 grams of diethyl sulfate were replaced by 2380 grams (10 moles) of di-n-amyl sulfate. The N-amyl iodide was distilled off as it was formed from the reaction mixture. When washed with the water and dried over anhydrous calcium chloride there was obtained 1440 grams of n-amyl iodide equivalent to 88% of theory.

We claim:

1. The process of preparing alkyl iodides which comprises reducing elemental iodine in an aqueous slurry containing $HSO_3^-$ ions to hydriodic acid and reacting the latter with an equivalent molar amount of a dialkyl sulfate in which the alkyl contains from 1 to 5 carbon atoms and at a pH of 1 to 6 and a temperature of 0°–100° C.

2. The process of preparing alkyl iodides which comprises reducing 1 mole of elemental iodine in an aqueous slurry with at least 2 moles of sodium sulfite to yield 2 moles of hydriodic acid and reacting 1 mole of the latter with 1 mole of a dialkyl sulfate in which the alkyl contains from 1 to 5 carbon atoms and at a pH of 1 to 6 and at a temperature of 0°–100° C.

3. The process of preparing alkyl iodides which comprises reducing 1 mole of elemental iodine in an aqueous slurry with at least 2 moles of sulfur dioxide gas to yield 2 moles of hydriodic acid and reacting 1 mole of the latter with 1 mole of a dialkyl sulfate in which the alkyl contains from 1 to 5 carbon atoms and at a pH of 1 to 6 and at a temperature of 0°–100° C.

4. The process according to claim 1 wherein the dialkyl sulfate is dimethyl sulfate.

5. The process according to claim 1 wherein the dialkyl sulfate is diethyl sulfate.

6. The process according to claim 1 wherein the dialkyl sulfate is dipropyl sulfate.

7. The process according to claim 1 wherein the dialkyl sulfate is dibutyl sulfate.

8. The process according to claim 1 wherein the dialkyl sulfate is diamyl sulfate.

9. The process of preparing alkyl iodides which comprises reducing 1 mole of elemental iodine in an aqueous slurry with at least 2 moles of sodium bisulfite to yield 2 moles of hydriodic acid and reacting 1 mole of the latter with 1 mole of a dialkyl sulfate in which the alkyl contains from 1 to 5 carbon atoms and at a pH of 1 to 6 and at a temperature of 0°–100° C.

References Cited in the file of this patent

UNITED STATES PATENTS

| | | |
|---|---|---|
| 2,398,179 | Galitzenstein | Apr. 9, 1946 |

FOREIGN PATENTS

| | | |
|---|---|---|
| 175,209 | Germany | Sept. 14, 1906 |